United States Patent [19]
Michl

[11] Patent Number: 5,244,036
[45] Date of Patent: Sep. 14, 1993

[54] OIL COOLER FOR A MOTORCYCLE WITH TEMPERATURE CONTROLLED BYPASS

[76] Inventor: Tom Michl, 4095 Orobangor Hwy., Oroville, Calif. 95966

[21] Appl. No.: 604,513

[22] Filed: Oct. 29, 1990

[51] Int. Cl.$^5$ .................... F01P 11/08; B60K 11/04
[52] U.S. Cl. .................... 165/36; 165/44; 165/51; 165/109.1; 165/179; 165/184; 165/916; 180/68.1; 180/68.4; 180/229
[58] Field of Search .............. 165/41, 44, 35, 38, 165/184, 177, 36, 51, 109.1, 179; 184/104.3; 123/196 AB; 138/38; 180/229, 68.1, 68.4

[56] References Cited

U.S. PATENT DOCUMENTS

| | | | |
|---|---|---|---|
| 657,684 | 9/1900 | Vorreiter | 180/68.4 |
| 1,666,485 | 4/1928 | Bradford | 180/68.4 |
| 1,881,770 | 10/1932 | Lyman | 165/147 |
| 2,275,576 | 3/1942 | Ware | 184/104.3 |
| 2,330,632 | 9/1943 | Seligman | 165/86 |
| 2,554,437 | 5/1951 | Alexander | 184/104.3 |
| 3,752,222 | 8/1973 | Olbermann, Jr. | 165/35 |
| 3,840,175 | 10/1974 | Jacuzzi | 165/38 |
| 4,016,945 | 4/1977 | Shibata | 180/229 |
| 4,186,817 | 5/1980 | Bauer | 180/68.1 |
| 4,193,442 | 3/1980 | Vian | 184/104.3 |
| 4,618,020 | 10/1986 | Noda et al. | 180/229 |
| 4,621,680 | 11/1986 | Funabashi | 165/44 |
| 4,640,341 | 2/1987 | Ozawa | 165/41 |
| 4,662,470 | 5/1987 | Fujisawa et al. | 165/44 |
| 4,673,032 | 6/1987 | Hara et al. | 165/44 |
| 4,995,448 | 2/1991 | Inagaki et al. | 184/104.3 |
| 5,002,117 | 3/1991 | Buckley et al. | 165/44 |

FOREIGN PATENT DOCUMENTS

| | | | |
|---|---|---|---|
| 3618794 | 12/1987 | Fed. Rep. of Germany | 184/104.3 |
| 2650 | of 1897 | United Kingdom | 165/177 |
| 13492 | of 1905 | United Kingdom | 165/177 |
| 621750 | 2/1927 | United Kingdom | 165/38 |
| 330053 | 1/1930 | United Kingdom | 165/37 |
| 709742 | 6/1954 | United Kingdom | 123/196 AB |

Primary Examiner—John K. Ford
Attorney, Agent, or Firm—Bernhard Kreten

[57] ABSTRACT

An oil cooling device for a motorcycle engine operating by convection heat transfer with air outside the device. A fin arrangement may be included to enhance the rate of heat exchange. The device conforms to forward portions of the motorcycle frame. The location of the device allows air needed to cool the engine to flow by the device uninhibited. This location is also unobtrusive and thus does not detract from the motorcycle's overall appearance. The oil cooling device is activated by a thermovalve which opens whenever a chosen temperature range is attained. This device could be incorporated into a motorcycle at manufacture or be configured for addition to a motorcycle to improve oil cooling as an auxiliary oil cooler.

29 Claims, 4 Drawing Sheets

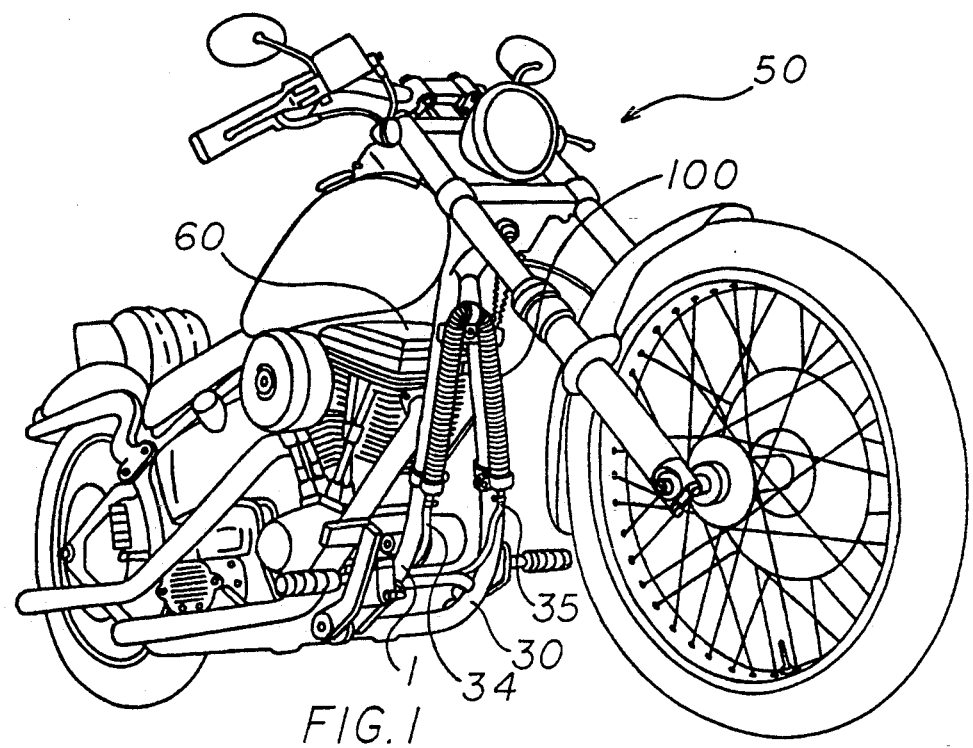
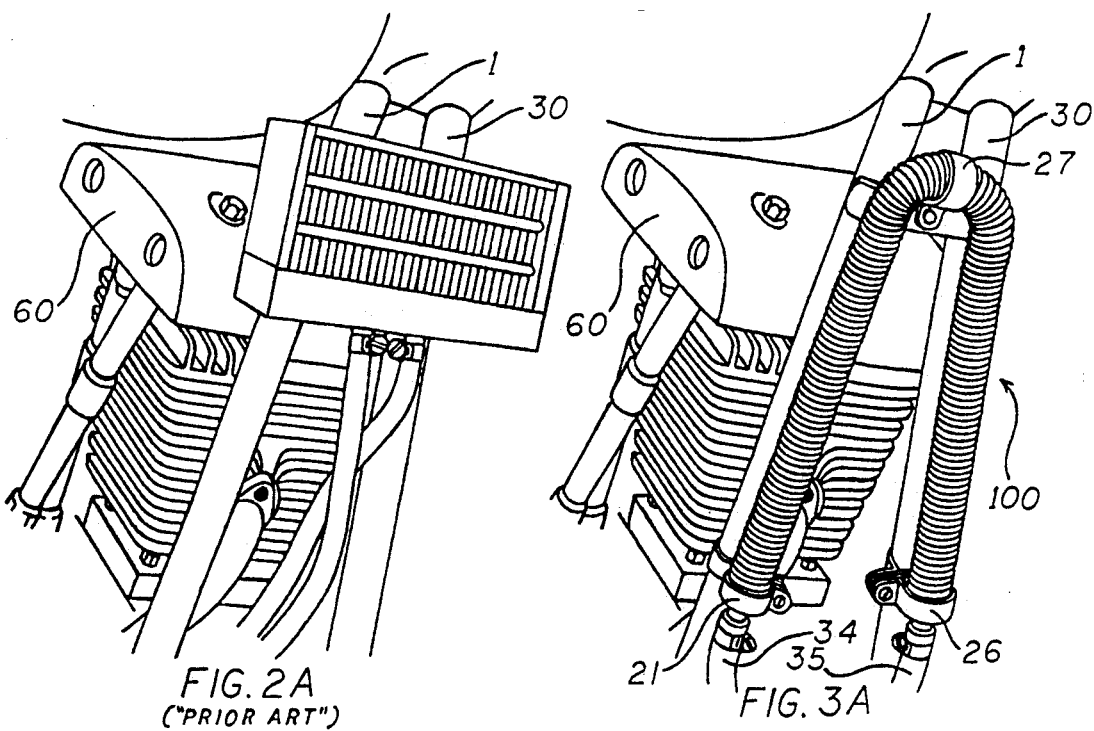
FIG. 1
FIG. 2A ("PRIOR ART")
FIG. 3A

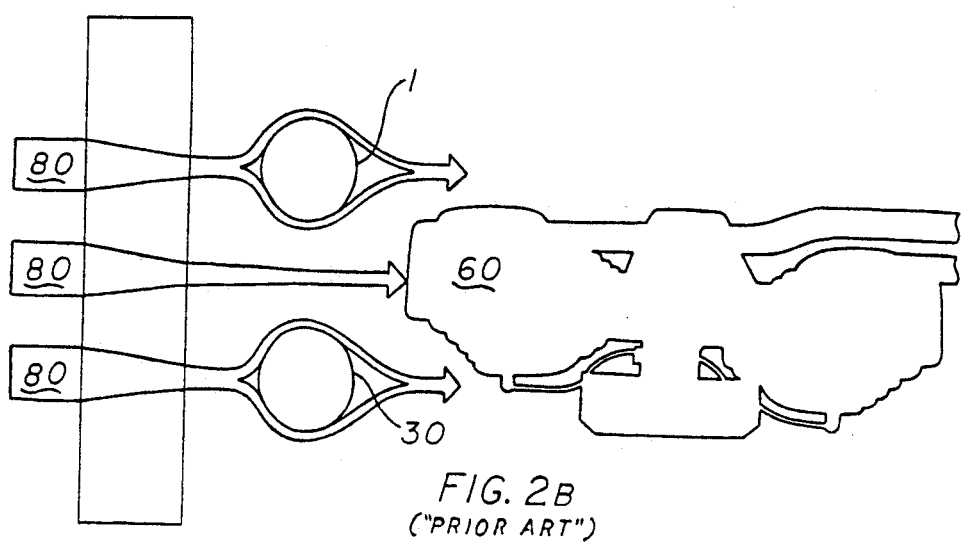
FIG. 2B ("PRIOR ART")
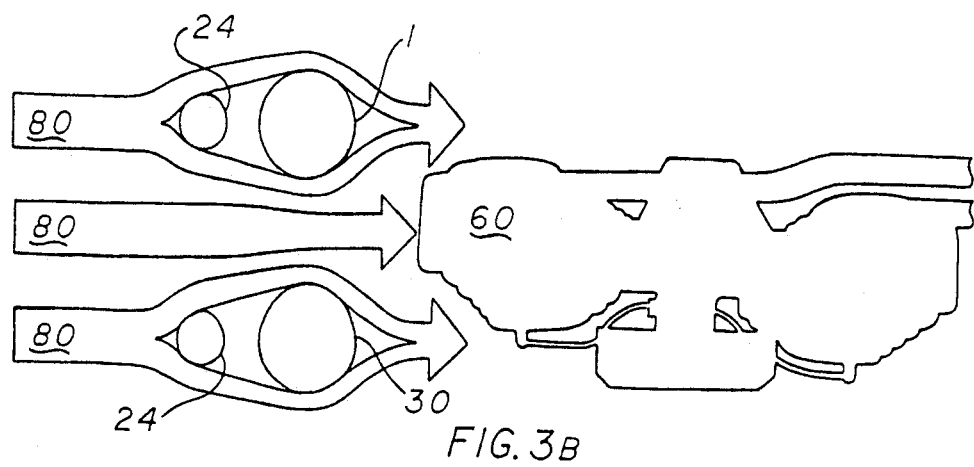
FIG. 3B
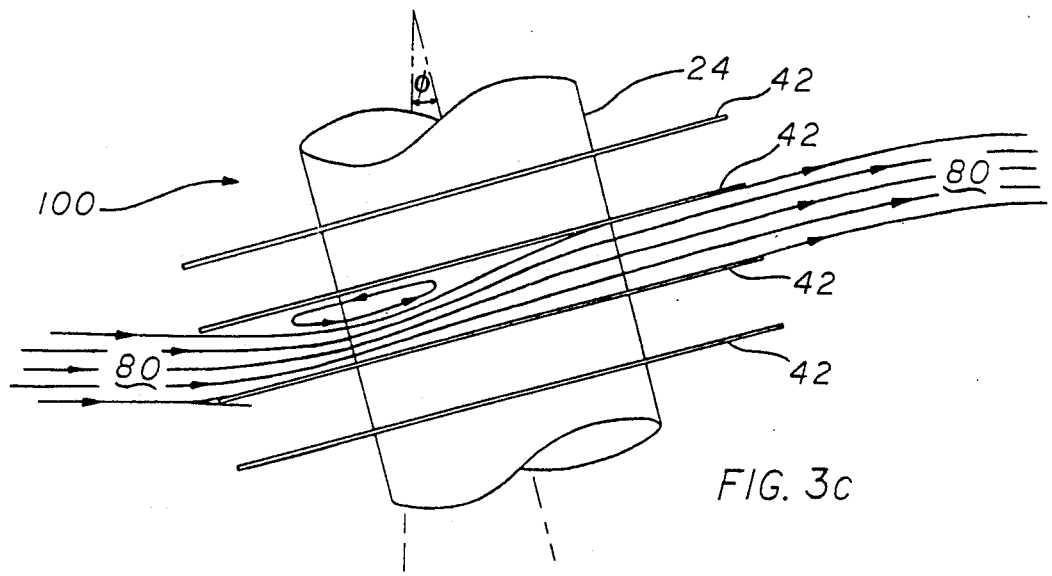
FIG. 3C

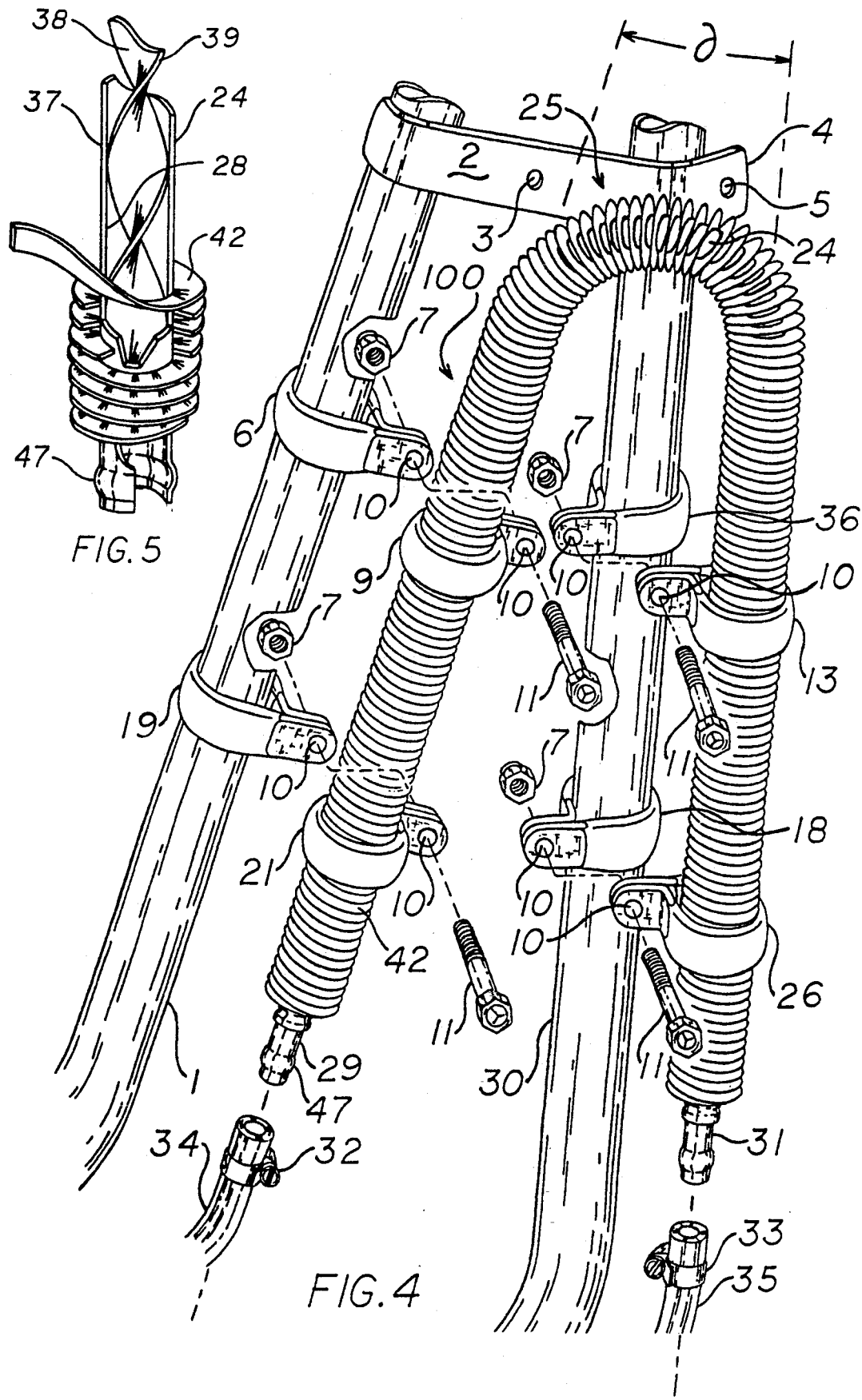

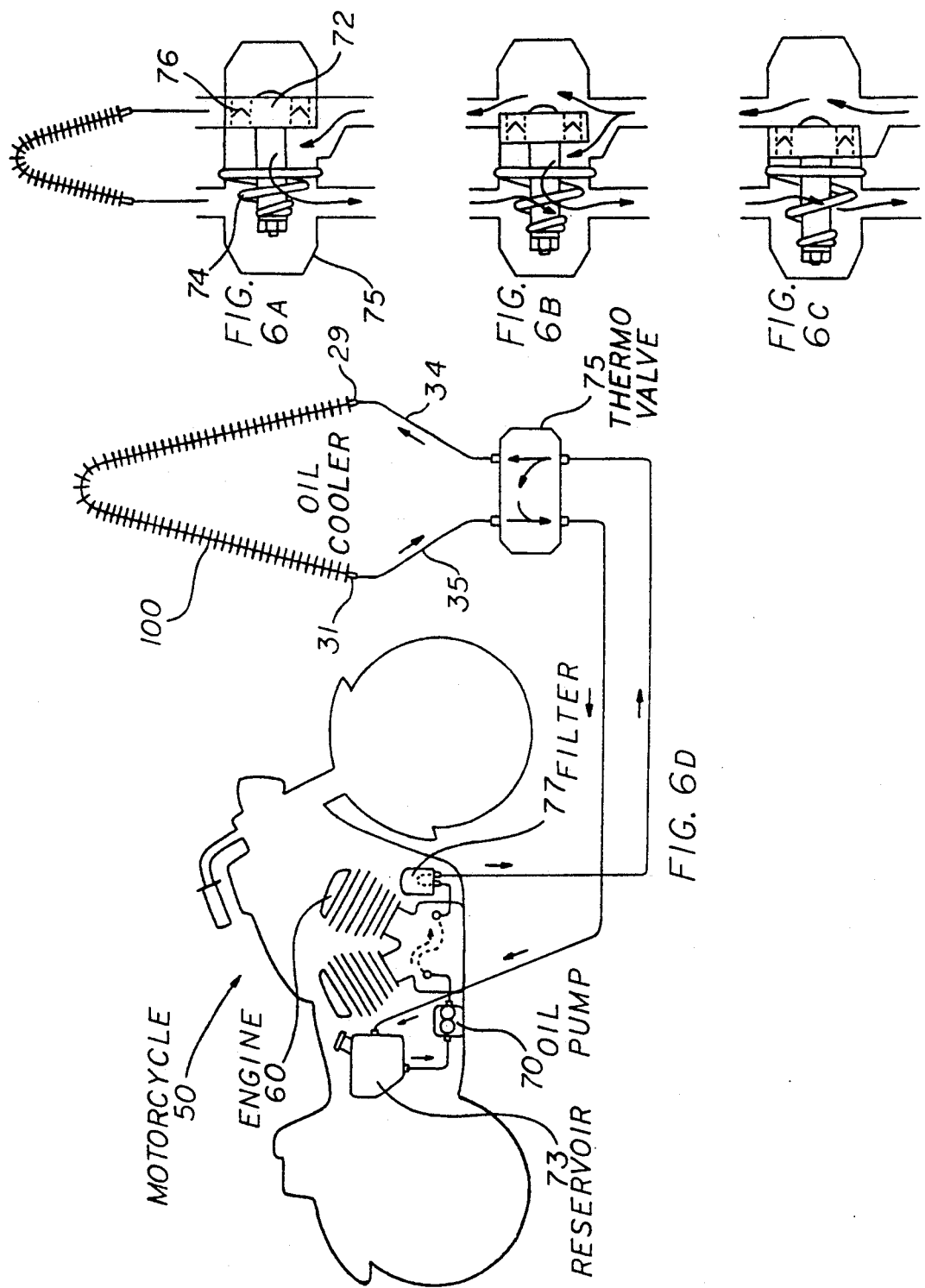

OIL COOLER FOR A MOTORCYCLE WITH TEMPERATURE CONTROLLED BYPASS

FIELD OF THE INVENTION

The following invention relates generally to a device for cooling engine lubricating oil. More specifically, this invention is especially designed to operate on a Harley-Davidson motorcycle without altering ordinary airflow cooling to the engine or substantially altering the basic appearance of the motorcycle. The invention functions generally as a liquid to air convection heat exchanger.

BACKGROUND OF THE INVENTION

Auxiliary oil coolers provide motorcycle owners with a way to improve their motorcycles by reducing the negative effects of excessive oil temperature. The auxiliary oil coolers currently existing are inadequate in a variety of ways. They obstruct the air flow needed to remove heat especially from an air-cooled engine; they substantially alter the appearance of the motorcycle; and, by using flow-through rather than bypass heat exchange techniques, they ineluctably become clogged with debris.

This invention substantially overcomes each of these inadequacies by changing the shape and orientation of the heat exchanger. By making these changes a more effective oil cooler is created with a more pleasing appearance that requires less frequent maintenance.

The following patents reflect the state of the art of which applicant is aware and are included herewith to discharge applicant's acknowledged duty to disclose relevant prior art. It is stipulated, however, that none of these references teach signally nor render obvious when considered in any conceivable combination the nexus of the instant invention as disclosed in greater detail hereinafter and as particularly claimed.

| INVENTOR | PATENT NO. | ISSUE DATE |
|---|---|---|
| Vorreiter, A. E. | 657,684 | September 11, 1900 |
| Bradford, C. W. | 1,666,485 | April 17, 1928 |
| Lyman, K. E. | 1,881,770 | October 11, 1932 |
| Seligman, R. A. L. | 2,330,622 | September 28, 1943 |
| Hauser, W. C. | Des. 233,984 | December 24, 1974 |
| Shibata, H. | 4,016,945 | April 12, 1977 |
| Bauer, R. E. | 4,186,817 | February 5, 1980 |
| Noda et al. | 4,618,020 | October 21, 1986 |
| Funabashi, K. | 4,621,680 | November 11, 1986 |
| Hara et al. | 4,673,032 | June 16, 1987 |

The Hara et al. patent is interesting in that it provides a radiator for a motorcycle including oil cooling means, which has a pathway for oil to flow which is surrounded by fins for heat dissipation. Applicant's oil cooler is clearly distinguishable in that it has an oil pathway of an inverted "V" shape capable of conforming to a forward portion of the frame of the motorcycle. This shape and orientation on the motorcycle substantially improves airflow to the engine and does not detract from the motorcycle's appearance.

The Vorreiter patent attains heat dissipation by circulating a liquid through a tube with fins. This patent is different from applicant's invention in that Vorreiter teaches circulation of water through the cooling system, and also the shape of Vorreiter inhibits its use on a motorcycle.

The other listed patents show the state of the art further.

SUMMARY OF THE INVENTION

This device functions essentially as a heat exchanger transferring heat from the oil of a motorcycle engine to the outside air passing about the moving motorcycle. The heat exchanger is a hollow tube with fins extending from the outer surface of the tube. The tube is shaped as an inverted "V" with the angle of divergence of straight side portions forming the "V" equal to the angle of divergence of two downwardly extending frame rails on a front of the motorcycle. This shape allows the oil cooler to be unobtrusively yet effectively oriented adjacent to and forward of the front frame rails of the motorcycle.

In this orientation the oil cooler leaves the existing airflow dynamics of the motorcycle substantially unaltered and does not detract from the appearance of the motorcycle as do other oil coolers currently available. At least one known, currently available oil cooler is of rectangular shape and is strapped across the frame rails of a Harley-Davidson directly in front of the engine. Motorcycle enthusiasts consider such a noticeable alteration in the motorcycle's appearance aesthetically displeasing.

Furthermore, the rectangularly shaped oil cooler blocks air from drawing heat directly off of the engine as effectively as the applicant's device. The applicant's oil cooler is streamlined to conform to the motorcycle for improved aerodynamics. As a by-pass heat exchanger, the applicant's device does not have orifices through which the air flow must pass-through. When bugs and debris get stuck in between the fins the passing airflow continues to apply pressure which may dislodge the obstruction. Pass-through oil coolers, like those currently available, get plugged with debris which obstruct the air flow. Once obstructed, the airflow is diverted around the oil cooler and the debris remains. Thus, the applicant's device has a self-cleaning quality which further improves the performance of the applicant's oil cooler.

The oil cooler is connected downstream from an oil filter which is downstream from an oil pump. The oil cooler is upstream from an oil reservoir which is upstream from the oil pump, thus completing a loop of components in series.

A thermovalve can be interposed parallel to the oil cooler. The thermovalve opens and closes due to changes in temperature. When the lubricating oil is cold the valve is closed, diverting all of the oil from the filter back to the reservoir. When a chosen temperature is exceeded the thermovalve begins to open diverting some oil through the oil cooler. If the temperature continues to rise, even more of the oil is diverted through the oil cooler. With the thermovalve, the oil cooler's usefulness may be enhanced, improving the function of the motorcycle.

OBJECT OF THE INVENTION

Accordingly, it is a primary object of this invention to provide a device for cooling engine oil through transfer of heat from the oil to the air outside an engine.

A further object of this invention is to improve the function of oil coolers on a motorcycle by shaping the oil cooler to conform to front frame rails of the motorcycle.

Another object of this invention is to provide an oil cooler which does not detract from the appearance of the motorcycle.

Still another object of this invention is to provide a kit which includes oil cooling apparatus including an oil cooler, mounting hardware, hoses, hose clamps and instructions for installation, and is capable of being added to a motorcycle for improved oil cooling capability.

Still another object of this invention is to provide an oil cooler which does not reduce the aerodynamic performance of a motorcycle upon which it is mounted.

Still another object of this invention is to provide an oil cooler with fins which resist obstruction by debris.

Viewed from a first vantage point, it is an object of this invention to provided additional motorcycle oil cooling by circulating the oil through a convection heat exchanger.

Viewed from another vantage point it is an object of this invention to provide a method for altering the heat profile and viscosity of a lubricant by drawing the lubricant from a heat source, circulating the lubricant through a heat exchanger and cooling the lubricant as it travels through the heat exchanger.

Viewed from a third vantage point, it is an object of the present invention to provide an oil cooler which improves the efficiency of an existing motorcycle, such as that made by Harley-Davidson without substantial modification of the motorcycle's appearance.

These and other objects will be made manifest when considering the following detailed specification and when taken in conjunction with the appended drawing figures wherein there has been provided an instrumentality which reduces the temperature and maintains optimum viscosity of motorcycle engine oil including a heat transfer tube, inlet means, outlet means, and a means to determine when to circulate lubricating oil through the heat transfer tube.

BRIEF DESCRIPTION OF THE DRAWING FIGURES

FIG. 1 is a side view of a motorcycle with the applicant's oil cooling device in position.

FIG. 2A (prior art) is an isometric view of a device currently available for oil cooling in position on a motorcycle.

FIG. 2B (prior art) is a schematic top view cross section of the device of FIG. 2A.

FIG. 3A is an isometric view of the applicant's oil cooling device in position on a motorcycle.

FIG. 3B is a schematic top view of the device of FIG. 3A.

FIG. 3C is a schematic side view of the device of FIG. 3A showing how a forward sweeping angle of the oil cooling device can increase the contact which the airstream has with the fins while passing through the oil cooling device.

FIG. 4 is an exploded isometric view of the cooling device.

FIG. 5 is a detail of a portion of the tube of FIG. 4 with a cutaway revealing internal parts.

FIG. 6A is a cut-away revealing details of a portion of the oil cooling device.

FIG. 6B is a cut-away revealing details of a portion of the oil cooling device.

FIG. 6C is a cut-away revealing details of a portion of the oil cooling device.

FIG. 6D is a schematic representing the flow of oil from the engine of the motorcycle through the oil cooler and back to the engine.

DESCRIPTION OF THE PREFERRED EMBODIMENT

Referring generally to the drawings, wherein like numerals represent like parts throughout, an oil cooler 100 for a motorcycle 50 is depicted which conforms to a leading portion of a motorcycle frame. In essence, especially in FIGS. 1 and 4, the oil cooler 100 has a tube 24 placed on a first frame rail 1 and a second frame rail 30 of a motorcycle 50 on downwardly extending portions thereof. On a motorcycle manufactured by Harley-Davidson, the first frame rail 1 and the second frame rail 30 are tubular constructs which extend downwardly at a forward portion of the motorcycle 50 and then extend rearwardly where they cradle an engine 60. The tube 24 has a fin 42 extending outwardly therefrom enhancing the heat exchange characteristics of the oil cooler 100. An inlet hose 34 is connected to one lower end 29 of the tube 24. Hose 34 connects to the engine 60 downstream from an oil filter 77 (FIG. 6D) with an optional thermovalve 75 interposed between the filter 77 and the hose 34. An outlet oil hose 35 is connected to another lower end 31 of the tube 24 which connects to the engine 60 upstream from an oil reservoir 73 and an oil pump 70 with an outlet of the thermovalve 75 interposed between the reservoir 73 and the hose 35.

Referring now to FIG. 4 and FIG. 5, where the oil cooler 100 is shown in detail, the oil enters the tube 24 of the cooler 100 from the inlet oil hose 34. The connection is formed by placing one end of the inlet oil hose 34 over a toroidal flare 47 on one lower end 29 of the tube 24, and then placing an inlet clamp 32 around the inlet oil hose 34 above the toroidal flare 47.

The oil then travels up the interior of the tube 24. As the oil moves along the tube 24, heat is drawn from the oil through an inner surface 28 of the tube 24. Within the tube 24 is a spiral 38. The spiral 38 is a helically twisting metal strip whose width is equal to the inner diameter of the tube 24 and whose length is equal to the length of the tube 24. The spiral 38 conducts heat to the walls of the tube 24 where edges 39 of the spiral 38 are electrically brazed to the inner surface 28 of the tube 24, greatly increasing the rate of heat flow. The spiral 38 also helps develop a turbulent flow within the tube 24 preventing any of the oil from passing through the tube 24 without coming near the inner surface 28 of the tube 24.

Fixedly attached to an outer surface 37 of the tube 24 is the fin 42. The fin 42 extends radially outwardly from the outer surface 37 in a pattern which wraps helically around the tube 24 from one lower end 29 to an other lower end 31 of the cooler 100. The fin 42 allows the outside airstream 80 to flow between the successive orbits of the fin 42 drawing heat away from the fin 42 and the outer surface 37 of the tube 24 by convection. An alternative to this single fin 42 design is a configuration with a plurality of parallel, disc-shaped fins orthogonal to the longitudinal axis of the tube 24 and fixedly attached to the outer surface 37 of the tube 24. The oil travels out of the tube 24 through the outlet oil hose 35, connected to the other lower end 31 of the tube 24 with an outlet clamp 33 and a toroidal flair 47 similarly to the connection of the inlet oil hose 34 and tube 24.

The tube 24 of the oil cooler 100 forms essentially an inverted "V" or "U" having substantially straight sides and a curved bight portion 25. The substantially straight sides of the "V" diverge from each other at a divergence angle ∂. This angle ∂ is preferably modifiable by hand, allowing the oil cooler 100 to be incorporated onto the frames of a variety of motorcycle models in a manner similar to that shown in FIG. 3A and FIG. 4. The tube 24 is fastened to one frame rail 1 and an other frame rail 30 of the motorcycle 50 by a plurality of clamping devices.

Referring specifically to FIG. 4, at the one lower end 29 of the tube 24, a one lower front clamp 21 is positioned around the fin 42 and the tube 24, and a one lower back clamp 19 is positioned around the one frame rail 1 of the motorcycle 50, with a cap screw 11 and nut 7 attaching together through clamp holes 10 in both the one lower back clamp 19 and the one lower front clamp 21.

Above the one lower end 29 of the tube 24 near a top curve 25 of the tube 24 a one upper front clamp 9 is positioned around the fin 42 and the tube 24, and a one upper back clamp 6 is positioned around the one frame rail 1 of the motorcycle 50. These clamps connect similarly to the one lower back clamp 19 and the one lower front clamp 21.

At the other lower end 31 of the tube 24, another lower front clamp 26 is positioned around the fin 42 and the tube 24, and another lower back clamp 18 is positioned around the other frame rail 30 of the motorcycle 50. These clamps connect similarly to the connection of the one lower back clamp 19 and the one lower front clamp 21.

Above the other lower front clamp 26 but below the top curve 25 of the tube 24 is another upper front clamp 13 positioned around the fin 42 and the tube 24, and another upper back clamp 36 is positioned around the other frame rail 30 of the motorcycle 50. These clamps connect similarly to the connection of the one lower back clamp 19 and the one lower front clamp 21.

A cross bar 2 may be connected between the one frame rail 1 and the other frame rail 30 at upper ends thereof having a cross bar hole 3. A top front clamp 27 as shown in FIG. 3A may be used in place of the clamps holding the upper end of the tube 24 in FIG. 4. The top front clamp 27 would connect to the cross bar 2 through the cross bar hole 3 with an appropriate bolt and nut assembly.

FIG. 2B (prior art) and FIG. 3B show a schematic comparison between the air flow pattern of a currently available auxiliary oil cooler (FIG. 2A [prior art]) and the air flow pattern of the oil cooler 100 (FIG. 3A). BY being a by-pass heat exchanger, rather than a flow-through heat exchanger, the cooler 100 allows a larger portion of the passing air stream 80 to contact the engine 60. The cooler of the prior art partially defeats its purpose by significantly reducing the portion of the air stream 80 which contacts the engine 60.

The one frame rail 1 and the other frame rail 30 of the motorcycle preferably extend at an angle φ somewhat away from vertical, as shown in FIG. 3C. The fin 42 is oriented substantially perpendicular to the tube 24 and thus orthogonal to the one frame rail 1 and the other frame rail 30 and somewhat away from a horizontal orientation. The horizontal air stream 80 impacting the tube 24 is diverted by the fin 42. In this way, convection heat transfer from the fin 42 and tube 24 to the air stream 80 is enhanced. FIG. 3C illustrates a simplified representation of the effect of the fin 42 on the air stream 80. The angle φ may be adjusted allowing the tube 24 to fit in front of a crash bar which is often attached laterally in front of motorcycle frame rails 1 and 30 and therefore behind the cooler 100.

The thermovalve 75, shown in detail in FIGS. 6A, 6B, 6C and 6D, is interposed between the inlet oil hose 34 and the outlet oil hose 35. A temperature sensitive spring 74 attaches to a spool 72. When the temperature of the oil is low the spring 74 is in a "cool" position blocking the inlet oil hose 34, as shown in FIG. 6A. When the temperature increases the spring 74 elongates forcing the spool 72 away from the "cool" position and oil begins to bypass the spool 72 and enter the cooler 100, as shown in FIG. 6B. If the temperature increases further the spool 72 is moved farther by the elongating spring 74 diverting all of the oil through the cooler 100, as shown in FIG. 6C. A relief 76 is formed in the spool 72 which opens if oil flow through the cooler 100 is obstructed allowing oil to bypass the cooler 100.

In use and operation, the oil cooler 100 preferably functions in the following manner. When the engine 60 of the motorcycle 50 is started, the oil pump 70 begins to circulate oil through the engine 60. The oil does not enter the oil cooler 100 until the thermovalve 75 senses a chosen temperature within a range of temperatures desired for optimal operation of the motorcycle 50. When the chosen temperature, typically 160° F., is exceeded, the valve 75 begins to open diverting some, but not all, of the lubricating oil through the cooler 100. If the temperature sensed by the thermovalve 75 continues to increase, the thermovalve 75 will open further, diverting more oil through the cooler 100. As the temperature of the oil increases, the activity of the cooler 100 increases and when the temperature decreases the activity of the cooler 100 decreases.

When the cooler 100 is active the lubricating oil path, as shown in FIG. 6C, is as follows: The oil travels from the reservoir 73, through the oil pump 70, through the engine 60, through the oil filter 77, to the thermovalve 75 where the oil is diverted into the inlet oil hose 34, through the cooler 100, through the outlet oil hose 35, back through the thermovalve 75, and then back into the reservoir 73.

When the oil cooler 100 is inactive, as shown in FIG. 6A, the lubricating oil path is as follows: The oil travels from the reservoir 73, through the oil pump 70, through the engine 60, through an oil filter 77 to the thermovalve 75 where the oil is diverted away from the oil cooler 100 and back to the reservoir 73.

When the oil cooler 100 is only partially active, as shown in FIG. 6B and FIG. 6D, the lubricating oil path is a combination of the active and inactive paths described above. Heat is added to the oil within the engine 60 and is removed from the oil within the tube 24 of the oil cooler 100.

The oil cooler 100 is primarily intended for use with Harley-Davidson motorcycles whose unique design especially benefits from an auxiliary oil cooler. The oil cooler 100 can be incorporated into a variety of motorcycles with modification of the shape of the tube 24 and other minor changes such as attachment means and tube 24 orientation.

Moreover, having thus described the invention, it should be apparent that numerous structural modifications and adaptations may be resorted to without departing from the scope and fair meaning of the instant invention as set forth hereinabove and as described hereinbelow by the claims.

I claim:

1. On a motorcycle having frame rails disposed forwardly of an engine of the motorcycle, a means for providing additional oil cooling through exchange of heat by convection from oil to outside air comprising in combination:

a hollow tube for transporting oil from the engine to be cooled, said tube paralleling the frame rails of the motorcycle, said tube having a width not greater than a width of the frame rails and located adjacent to the frame rails and forward thereof, such that said oil cooling means is sized and shaped to avoid blockage of air to the engine, an engine oil reservoir interfacing means operatively coupled with said tube, and a frame attachment means interposed between said tube and the frame.

2. The oil cooling device of claim 1 wherein said tube contains a spiral electrically brazed to interior walls of said tube and therefore having thermal and mechanical means between said spiral and said tube completely bisecting the interior of said tube into two half-circle channels, and wherein said spiral twists helically as it travels along the longitudinal axis of said tube;

whereby said spiral increases the interior surface area of said tube, increasing the rate of heat transfer from the interior of said tube through transfer laterally from a center of said spiral to edges of said spiral contacting said tube and the twists of said plate cause oil flow turbulence, increasing the rate of heat transfer from the interior of said tube.

3. On a motorcycle having frame rails disposed forwardly of an engine of the motorcycle, a means for providing additional oil cooling through exchange of heat by convection from oil to outside air comprising in combination:

a hollow tube for transporting oil from the engine to be cooled, said tube shaped to conform to the frame rails of the motorcycle, and located adjacent to the frame rails and forward thereof, an engine oil reservoir interfacing means operatively coupled with said tube, and a frame attachment means interposed between said tube and the frame, and wherein said tube conforms closely to the cross-sectional area of the two frame rails on the forward portion of the motorcycle such that the frontal area of said tube is substantially the same as the frontal area of the frame rails of the motorcycle;

whereby when said oil cooling device is placed adjacent to and forward of the frame rails of the motorcycle, the frontal area of the motorcycle will be left substantially unaltered thus avoiding obstruction of the air flow to the engine of the motorcycle.

4. The oil cooling device of claim 3 wherein fins extend radially outwardly from said tube substantially perpendicular to a longitudinal axis of said tube.

5. The oil cooling device of claim 4 wherein said fins below a top curve of said tube are oriented at an angle slightly away from horizontal with greater elevation downstream, whereby air is deflected upwards slightly providing greater heat dissipation from an upper end of the engine and compensating for air flow blockage caused by said top curve of said tube.

6. The oil cooling device of claim 3 wherein said tube has an inlet for receiving hot oil from the engine of the motorcycle, and an outlet for returning cooled oil to the engine of the motorcycle, said inlet and said outlet capable of maintaining a high pressure seal.

7. The oil cooling device of claim 3 wherein said frame attachment means is a plurality of clamps with associated bolt and nut assemblies girding said tube to the frame, whereby said tube is attached to the frame rails of the motorcycle.

8. The oil cooling device of claim 4 wherein said fins are one long spiraling fin fixedly attached on one side to said tube's outer surface along a line which wraps helically around said tube.

9. The oil cooling device of claim 4 wherein said tube is angled slightly away from a vertical orientation through attachment adjacent to the frame rails of the motorcycle, whereby said fins surrounding said tube are angled slightly away from a horizontal orientation causing a horizontal air flow to encounter additional turbulence when passing through said fins, thereby increasing the residence time of air between the fins and increasing the amount of convective heat transfer from said fins to the passing horizontal air flow.

10. The oil cooling device of claim 3 wherein said oil reservoir interfacing means includes an outlet hose which attaches on a first end to said outlet of said tube and attaches on a second end to said oil reservoir, and an inlet hose which attaches on a first end to an oil filter downstream from said oil reservoir and connects on a second end to said inlet of said tube, with each connection maintaining a high pressure seal.

11. The oil cooling device of claim 23 wherein said oil reservoir interfacing means contains:

an oil pump, and a thermovalve connected to said oil reservoir downstream from said oil pump and said oil filter, whereby when said thermovalve senses an excessive oil temperature it opens allowing the oil in the oil reservoir to circulate through said oil cooling device cooling said oil until said thermovalve senses a designated lower temperature and causes said thermovalve to be closed.

12. The oil cooling device of claim 11 wherein said thermovalve is interposed within said inlet hose and said outlet hose whereby said thermovalve may open to divert excessively heated oil through said tube and close to divert excessively cooled oil away from said tube without diverting oil from said oil pump, said oil reservoir or said oil filter.

13. A method for altering the heat profile and viscosity of a lubricating medium including the steps of:

scavenging the lubricating medium from a heat source in an engine of a motorcycle which moves relative to an air mass, routing the lubricating medium from the heat source through a thermovalve then along a pathway which is located forward of frame members supporting the engine on a leading side of the motorcycle as it passes through the air mass, and which said pathway is within a tube which parallels the frame members, the tube having a width not greater than a width of the frame members; then back to the heat source, cooling the lubricating medium as it travels along the pathway by allowing an air mass to draw heat off of the pathway as the motorcycle passes through the air mass while leaving the air mass substantially undiverted allowing the air mass to draw heat off of the engine's exterior subsequently, and recirculating the lubricating medium from the heat source and through the pathway to keep the lubricating medium at a reduced, beneficial and uniform temperature.

14. The method of claim 13 wherein said routing includes steps of:
sensing when the lubricating medium is of a temperature needing cooling, and
opening the thermovalve diverting a portion of the lubricating medium through the pathway when the lubricating medium is of a temperature needing cooling.

15. The method of claim 13 wherein said routing includes rotating of the lubricating medium as it travels along the pathway with a helical insert within the pathway, said rotating increasing the rate of heat transfer by mixing the oil.

16. The method of claim 13 wherein said routing includes configuring the pathway to conform to the forward frame rails of a motorcycle.

17. The method of claim 13 wherein said cooling includes increasing heat dissipation surface area of the pathway by placing fins along an outer surface of the pathway.

18. The method of claim 13 wherein said cooling includes placing fins along an outer surface of the pathway angled slightly away from horizontal with greater elevation downstream in the air mass directing the passing air mass upwards, causing both greater heat dissipation along said pathway and greater air mass circulation over an upper portion of the engine leading to greater engine heat dissipation.

19. The method claim 18 wherein fins extend radially outwardly from said tube substantially perpendicular to a longitudinal axis of said tube.

20. A Harley-Davidson motorcycle, including a plurality of wheels supporting a frame, an air cooled engine supported on the frame, the frame having a forward portion between the engine and a forward said wheel, the frame forward portion formed from two downwardly and outwardly directed frame members,
an oil cooling means including two downwardly and outwardly directed portions closely conforming to the frame members and disposed forwardly thereof such that air required for cooling of the engine is not diverted substantially by said oil cooling means,
said oil cooling means comprised of a tube which parallels the frame members, said tube having a width not greater than a width of the frame members, and
means coupling said oil cooling means to the engine.

21. A Harley-Davidson motorcycle, including a plurality of wheels supporting a frame, an engine supported on the frame, the frame having a forward portion between the engine and a forward said wheel, the frame forward portion formed from two downwardly and outwardly directed frame members,
an oil cooling means paralleling the frame members disposed forwardly thereof, and
means coupling said oil cooling means to the engine, and
wherein said oil cooling means includes a tubular portion of a diameter similar to that of said frame members fastened to said frame members of said motorcycle and forward thereof which circulates the oil to be cooled, thereby leaving the appearance of said motorcycle substantially unchanged and the passing airflow substantially unchanged.

22. The motorcycle of claim 21 wherein said tubular portion has a fin extending helically outwardly, thereby increasing the rate of heat transfer from the oil.

23. The motorcycle of claim 22 wherein said tubular portion contains a spiral which divides the interior of said tubular portion into two semi-circular cross sections, and which twists helically, whereby the rate of heat transfer is increased.

24. The motorcycle of claim 23 wherein said coupling means includes:
an input oil hose interposed between said engine and said tubular portion,
an output oil hose interposed between said tubular portion and said engine,
an oil pump providing for circulation of the cooling oil, and
a thermovalve which provides the oil with access to said tubular portion of said oil cooling means.

25. A Harley-Davidson motorcycle, including a plurality of wheels supporting a frame, an engine supported on the frame, the frame having a forward portion between the engine and a forward said wheel, the frame forward portion formed from two downwardly and outwardly directed frame members,
an oil cooling means closely conforming to the frame members disposed forwardly thereof,
said oil cooling means comprised of a tube which parallels the frame members, said tube having a width not greater than a width of the frame members, and
means coupling said oil cooling means to the engine;
whereby air required for cooling of the engine is not diverted substantially by said oil cooling means, and
wherein said tubular portion has a fin extending helically outwardly, thereby increasing the rate of heat transfer from the oil.

26. A Harley-Davidson motorcycle, including a plurality of wheels supporting a frame, an engine supported on the frame, the frame having a forward portion between the engine and a forward said wheel, the frame forward portion formed from two downwardly and outwardly directed frame members,
an oil cooling means closely conforming to the frame members disposed forwardly thereof,
said oil cooling means comprised of a tube which parallels the frame members, said tube having a width not greater than a width of the frame members, and
means coupling said oil cooling means to the engine;
whereby air required for cooling of the engine is not diverted substantially by said oil cooling means, and
wherein said tubular portion contains a spiral which divides the interior of said tubular portion into two semi-circular cross-sections, and which twists helically, whereby the rate of heat transfer is increased.

27. A Harley-Davidson motorcycle, including a plurality of wheels supporting a frame, an engine supported on the frame, the frame having a forward portion between the engine and a forward said wheel, the frame forward portion formed from two downwardly and outwardly directed frame members,
an oil cooling means closely conforming to the frame members disposed forwardly thereof, said oil cooling means comprised of a tube which parallels the frame members, said tube having a width not greater than a width of the frame members, and means coupling said oil cooling means to the engine;

whereby air required for cooling of the engine is not diverted substantially by said oil cooling means, and wherein said coupling means includes:

an input oil hose interposed between said engine and said tubular portion, an output oil hose interposed between said tubular portion and said engine, an oil pump providing for circulation of the cooling oil, and a thermovalve which provides the oil with access to said tubular portion of said oil cooling means.

28. The oil cooling device of claim 27 wherein said fins below a top curve of said tube are oriented at an angle slightly away from horizontal with greater elevation downstream, whereby air is deflected upwards slightly providing greater heat dissipation from an upper end of the engine and compensating for air flow blockage caused by said top curve of said tube.

29. A Harley-Davidson motorcycle, including a plurality of wheels supporting a frame, an engine supported on the frame, the frame having a forward portion between the engine and a forward said wheel, the frame forward portion formed from two downwardly and outwardly directed frame members, an oil cooling means closely conforming to the frontal area of the frame members disposed forwardly thereof, said oil cooling means comprised of a tube which parallels the frame members, said tube having a width not greater than a width of the frame members, and means coupling said oil cooling means to the engine;

whereby air required for cooling of the engine is not diverted substantially by said oil cooling means.

* * * * *